(12) United States Patent
Sticker et al.

(10) Patent No.: US 12,335,614 B2
(45) Date of Patent: Jun. 17, 2025

(54) METHOD AND DEVICE FOR DETERMINING THE OPTIMAL POSITION OF THE FOCAL PLANE FOR EXAMINING A SPECIMEN BY MICROSCOPY

(71) Applicant: Carl Zeiss Microscopy GmbH, Jena (DE)

(72) Inventors: Markus Sticker, Jena (DE); Christoph Husemann, Jena (DE); Lutz Schaefer, Kitchener (CA)

(73) Assignee: Carl Zeiss Microscopy GmbH, Jena (DE)

( * ) Notice: Subject to any disclaimer, the term of this patent is extended or adjusted under 35 U.S.C. 154(b) by 556 days.

(21) Appl. No.: 17/667,077

(22) Filed: Feb. 8, 2022

(65) Prior Publication Data

US 2022/0252856 A1    Aug. 11, 2022

(30) Foreign Application Priority Data

Feb. 9, 2021    (DE) .......................... 102021102990.2

(51) Int. Cl.
*H04N 23/67*    (2023.01)
*G02B 21/06*    (2006.01)
(Continued)

(52) U.S. Cl.
CPC ........... *H04N 23/672* (2023.01); *G02B 21/06* (2013.01); *G02B 21/244* (2013.01); *G02B 21/361* (2013.01); *G02B 21/365* (2013.01)

(58) Field of Classification Search
CPC .... H04N 23/672; G02B 21/06; G02B 21/244; G02B 21/361; G02B 21/365; G02B 21/241
(Continued)

(56) References Cited

U.S. PATENT DOCUMENTS

2015/0264250 A1*  9/2015  Ou ......................... G02B 27/46
                                                       348/77
2016/0139388 A1   5/2016  Asundi et al.
(Continued)

FOREIGN PATENT DOCUMENTS

DE   102004047928 A1 *  4/2006  ............. G01B 11/24
DE   102012217745 A1     4/2014

OTHER PUBLICATIONS

A. Barty et al.: "Quantitative optical phase microscopy", Optics Letters, Jun. 1, 1998, vol. 23, No. 11, 3 pages.
(Continued)

*Primary Examiner* — Thanh Luu
*Assistant Examiner* — Mai Thi Ngoc Tran
(74) *Attorney, Agent, or Firm* — Skaar Ulbrich Macari, P.A.

(57) ABSTRACT

A method for determining the optimal position of the focal plane for examining a specimen by microscopy can include a) illuminating the specimen with light and recording images at different positions of the focal plane to provide a stack of intensity images, b) calculating a phase image from at least two intensity images, with the calculated phase image being assigned a focal plane position located within a focal plane region whose boundaries are the two most spaced apart positions of the focal plane of the at least two intensity images, c) repeating step b) multiple times with different intensity images such that a stack of phase images is available, d) calculating at least one focus measure value for each phase image, and e) determining the optimal position of the focal plane on the basis of the calculated focus measure values and the focal plane positions assigned to the phase images.

9 Claims, 2 Drawing Sheets

(51) Int. Cl.
    *G02B 21/24*         (2006.01)
    *G02B 21/36*         (2006.01)

(58) Field of Classification Search
    USPC ................................. 250/216, 201.3; 248/79
    See application file for complete search history.

(56) References Cited

U.S. PATENT DOCUMENTS

| | | |
|---|---|---|
| 2016/0341946 A1 | 11/2016 | Wenger et al. |
| 2017/0115557 A1 | 4/2017 | Peters et al. |
| 2019/0004304 A1* | 1/2019 | Gaiduk .............. G02B 21/0068 |
| 2019/0235224 A1* | 8/2019 | Small ................... G02B 21/367 |
| 2021/0156782 A1 | 5/2021 | Holm |

OTHER PUBLICATIONS

R. Redondo et al.: "Evaluation of autofocus measures for microscopy images of biopsy and cytology", Proc of SPIE vol. 8011 801194-1 to 801194-9, Nov. 2, 2011, 9 pages.

D. Paganin and K.A. Nugent, "Noninterferometric Phase Imaging with Partially Coherent Light", Phys. Rev. Lett. 80 (12), 2586-2589, Mar. 23, 1998, 4 pages.

* cited by examiner

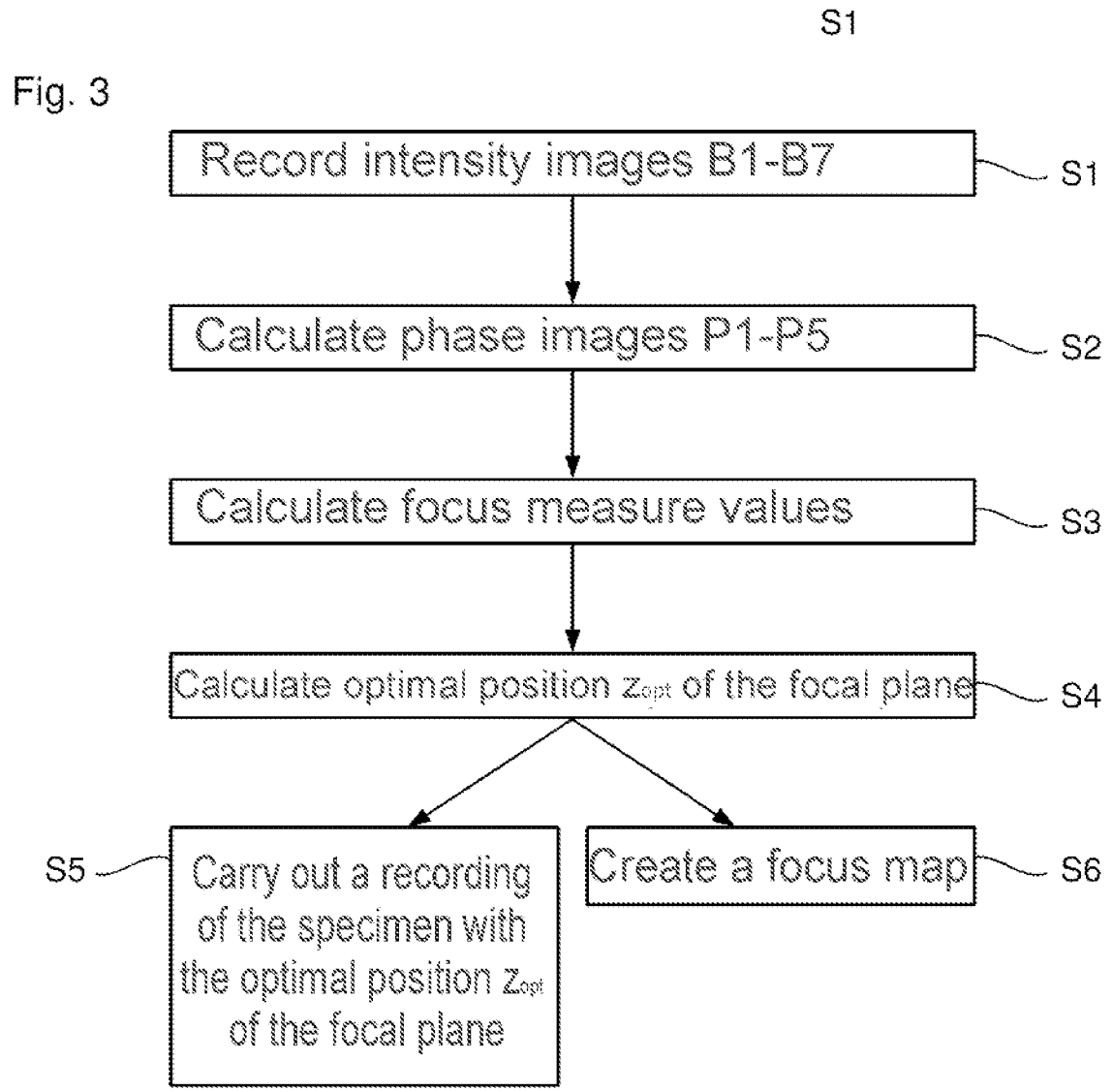

METHOD AND DEVICE FOR DETERMINING THE OPTIMAL POSITION OF THE FOCAL PLANE FOR EXAMINING A SPECIMEN BY MICROSCOPY

PRIORITY

This application claims the benefit of German Patent Application No. 102021102990.2, filed Feb. 9, 2021, which is hereby incorporated herein by reference in its entirety.

FIELD

The present invention relates to a method and a device for determining the optimal position of the focal plane for examining a specimen by microscopy.

BACKGROUND

Unstained or fluorescence-stained microscopic specimens in particular frequently exhibit only little contrast in a transmitted light recording within the scope of microscopy. Therefore, the optimal position of the focal plane, which may also be referred to as the focus of the specimen, in many cases cannot be determined using a contrast-based software autofocus, in the context of which a plurality of transmitted light images are recorded at different working distances or "focal positions" and a focus measure evaluation is carried out. Optical contrast methods such as DIC or phase contrast methods can be used to increase the contrast of unstained specimens. However, this requires optical elements which either need to be removed from the beam path for the then desired fluorescence recording to be carried out or, should these not be removed, impair the fluorescence recordings. Furthermore, using fluorescence recordings to determine the focus is known, with in that case, for example in the case of confocal detection, the level of the fluorescence signal being used instead of the sharpness in the image. However, fluorescence recordings generally require longer exposure times, and so the focusing procedure requires a relatively long time. Moreover, there is the risk of the fluorescence dye bleaching, already during this determination of the focus or as a result of subsequent further doses of light, or of the cell being impaired by the excitation light in the case of living cell imaging.

SUMMARY

Proceeding therefrom, it is an object herein to provide a method and a device for determining the optimal position of the focal plane for an examination by microscopy, in such a way that the optimal position of the focal plane can be determined robustly, quickly and where possible without additional costs for the system.

In the intensity images of the illuminated specimen as per step a), the phase differences in the specimen, depending on the position of the focal plane, are identifiable as changes of the intensity in the image. Therefore, the phase images as per step b) exhibit phase contrasts which increase in size, the closer the intensity images were recorded to the optimal position of the focal plane. Further, there is a change not only in the phase contrast but also in the structures in the image, and so the phase contrast image also has greater high-frequency components in the optimal position of the focal plane. Therefore, depending on the focus measure, such frequency components in the phase contrast image can be used to determine the optimal position of the focal plane.

Then, the phase images can be assessed in step d) using a known focus measure (in particular a contrast-based focus measure) such that a corresponding focus measure value can be calculated for each phase image. Then, the optimal position of the focal plane for an examination by microscopy can be determined from the sequence of focus measure values. By way of example, the maximum of the focus measure values may be sought after, and a parabola may be fitted to the maximum and its adjacent values. Then, the relative position of the parabola specifies where the optimal position of the focal plane is located. The latter may also be located between the positions of the focal planes of the intensity images. However, it is also possible to ascertain the maximum of the focus measure values and to determine the focal plane position of the corresponding phase image as the optimal position of the focal plane.

In step a), the focal plane positions for recording the intensity images can be homed in on using a start-stop mode. However, it is also possible to implement a continuous movement over the entire z-range to be traversed (all desired positions of the focal plane) and to record the specimen at the envisaged focal plane positions. By virtue of the recording being implemented when the focal plane position is reached and by virtue of illumination only being effected by short light pulses (for example of the order of 10 µs), a motion blur in the intensity images is minimized. Alternatively, it is also possible to set the exposure time of the camera used for the recording to be sufficiently short such that then a continuous illumination or an ongoing illumination is possible.

To be able to know or define the position of the focal plane as accurately as possible when recording the specimen, the recording, the illumination and/or the movement of the specimen can advantageously be controlled by way of a trigger.

In particular, the recordings in step a) can be transmitted light recordings. However, it is also possible to carry out reflected light recordings.

Preferably three intensity images are used in step b) for the purpose of calculating a phase image. However, it is also possible to use four, five, six or more intensity images for the purpose of calculating a phase image.

In particular, the distance between the positions of the focal plane of two adjacent intensity images, as recorded in step a), can correspond to two times the depth of field of the recording optical unit used to record the images. The distance between the positions of the focal planes of adjacent intensity images is preferably constant. However, this distance may also vary.

The positions of the focal planes of all intensity images recorded in step a) can also be referred to as a z-stack region. By way of example, such a z-stack region can be adjusted to a focal value obtained earlier (e.g. by virtue of changing the relative position and size of the region of the z-stack). By way of example, if a focal position could already be ascertained in the vicinity (that is to say in the lateral direction), then the z-stack range can be adjusted thereto (for example minimized). If no focal position could be ascertained, then the z-stack region can be adjusted thereto (for example expanded). However, it is also possible to specify a fixedly predetermined z-stack region and to traverse the latter in step a). A focal value ascertained at an earlier point can be used as a center of the subsequent z-stack, for example.

At least two intensity images can each be assigned directly adjacent positions of the focal plane in step b). To be able to calculate a phase contrast image, it may be advantageous to use intensity images which are not direct neighbors in the z-stack. By way of example, these can then have a greater distance from one another than the intensity images in the recorded z-stack. Thus, for example, the next but one or the third closest or fourth closest image in the stack can be used to calculate the phase contrast image.

The specimen can be illuminated with incoherent light. Preferably, the specimen is illuminated with partly coherent light. This is in particular understood to mean that there is a restricted spatial coherence and/or temporal coherence. By way of example, a restricted spatial coherence can be generated by virtue of the numerical aperture of an illumination module for illuminating the specimen with light in step a) being less than the numerical aperture of an imaging module for recording the images of the illuminated specimen in step a). In particular, the numerical aperture of the illumination module can be less than or equal to 0.9-times, 0.8-times, 0.7-times, 0.66-times, 0.6-times or 0.5-times the numerical aperture of the imaging module A value of less than or equal to 0.16, 0.1 or 0.09 may be present as absolute value of the numerical aperture of the illumination module.

Temporal coherence can be generated by restricting the wavelength spectrum of the illumination light. Appropriate filters can be provided to this end. In particular, it is possible for the wavelength spectrum to be less than or equal to 70 nm or 60 nm.

Moreover, it is possible to restrict the temporal coherence on the detection side in such a way that the light coming from the specimen is filtered so that the spectrum has a bandwidth of less than or equal to 70 nm or 60 nm, with the images being recorded in step a) using the filtered light. By way of example, the fluorescence emission filter in the detection beam path, provided in a fluorescence microscope, can be used to this end.

Further, it is also possible to generate the light for illuminating a specimen in step a) using a light source with a narrow spectrum. Such a light source can be an LED light source or a laser light source. The wavelength of the light for illuminating the specimen in step a) can be in the visible wavelength range or else in the near infrared range.

The values of two, three or more different focus measures can be calculated in step d). These values of the various focus measures can be considered, for example, in weighted fashion or by way of a majority decision in step e).

Using the determined optimal position of the focal plane it is then possible, for example, to perform a recording of the specimen which is as sharp as possible (wherein an offset from the optimal position of the focal plane may be added, for example to take account of longitudinal chromatic aberrations of the recording optical unit in the case of recordings with different wavelengths or wavelength ranges) and/or to create a focus map of the specimen. The examination of the specimen by microscopy can be implemented using a microscope which can be a fluorescence microscope, in particular. The specimen can be an unstained or fluorescence-stained specimen. The microscope may be designed as a transmitted light microscope and/or reflected light microscope.

In particular, the device for determining the optimal position of the focal plane for examining a specimen by microscopy may be realized by means of a microscope.

It is understood that the features specified above and the features yet to be explained below can be used not only in the specified combinations, but also in other combinations or on their own, without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

BRIEF DESCRIPTION OF THE DRAWINGS

FIG. 3 shows a schematic illustration of a flowchart for an embodiment of the method according to the invention for determining the optimal position of the focal plane for examining a specimen by microscopy.

DETAILED DESCRIPTION

Figure 1:
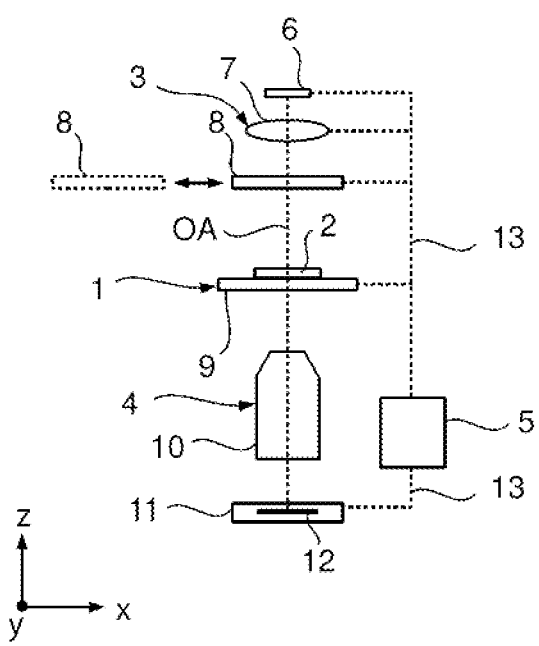
FIG. 1 shows a schematic view of an embodiment of the device according to certain embodiments of the invention for determining the optimal position of the focal plane for examining a specimen by microscopy.

FIG. 1 schematically shows the structure of an embodiment of the device 1 according to the invention for determining the optimal position of the focal plane for examining a specimen 2 by microscopy, implemented in this case as a microscope 1 for determining the optimal position of the focal plane of a specimen 2. In this embodiment, the microscope 1 is designed as an inverted transmitted light microscope which comprises an illumination module 3, an imaging module 4 and a control unit 5 for controlling the illumination and imaging modules 3, 4 (indicated by dashed lines 13). Further, the optical axis OA is plotted schematically.

The illumination module 3 comprises a light source 6 (e.g. an LED light source), a condenser optical unit 7 and a spectral bandpass filter 8. The bandpass filter 8 can be moved back and forth between the dashed position in FIG. 1, where it is positioned outside of the beam path, and the position shown using the solid line, where it is positioned within the beam path.

The light source 6 can preferably emit light from the visible wavelength range and/or from the infrared range.

The imaging module 4 may comprise a specimen stage 9, an imaging optical unit 10 and a camera 11 with an image sensor 12 (e.g. a CCD sensor or a CMOS sensor).

The specimen 2 might be an unstained or a fluorescence-stained specimen 2 which frequently exhibits only very little contrast in a transmitted light recording such that ascertaining the optimal position of the focal plane of the specimen is difficult or impossible using the methods known to date.

According to the invention, the control unit 5 controls the illumination module 3 in such a way for the ascertainment of the optimal position of the focal plane that the specimen 2 is illuminated with partly coherent light, as a result of which a transmitted light recording of the specimen 2 recorded by means of the imaging optical unit 10 and the camera 11 becomes richer in contrast.

Since a transmitted light illumination unit in a conventional microscope is usually equipped with an incoherent light source, the spatial and/or temporal coherence can be increased according to the invention by virtue of resorting to components of the microscope that frequently belong to the basic equipment of a microscope. By way of example, the spatial coherence of an incoherent light source 6 can be increased by virtue of providing a small aperture in the aperture plane, or drawing together an iris diaphragm of the condenser optical unit 7 and thus reducing the size thereof. Preferably, the numerical aperture of the illumination module 3 is less than the numerical aperture of the imaging module 4. Thus, the numerical aperture of the illumination module 3 can be 0.1, 0.16, 0.1 or 0.09, for example.

By way of example, the temporal coherence can be increased by restricting the spectrum of the light emitted by the light source 6 using the spectral bandpass filter 8. By way of example, the bandwidth of the spectrum of the emitted light can be less than or equal to 70 nm or 60 nm.

Figure 2:
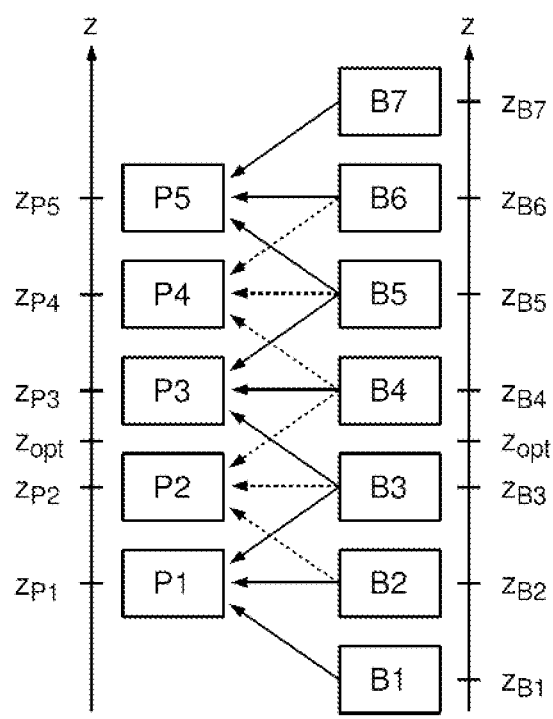
FIG. 2 shows a schematic illustration for discussing the recorded intensity images and the phase images calculated therefrom.

In this way, the light from the light source 6 can be incident on the specimen 2 as partly coherent light and hence can illuminate the specimen therewith. In the process, images of the illuminated specimen 2 are implemented in transmitted light at different positions of the focal plane by means of the imaging optical unit 4 and the camera 11 such that a stack of intensity images of the illuminated specimen is available, with each intensity image being assigned a position (z-position) of the focal plane (step S1 in FIG. 3). In the example described here, seven intensity images B1, B2, . . . B7, for example, are recorded as illustrated schematically in FIG. 2, each intensity image being assigned a z-position ($z_{B1}$, $z_{B2}$ . . . $z_{B7}$) of the focal plane.

Consequently, a stack of intensity images B1-B7 is available, which may also be referred to as a defocus stack B1-B7.

As yet to be described below, a z-stack of phase images is calculated from these intensity images B1-B7 (step S2 in FIG. 3). What is exploited here is that phase differences in the specimen 2 depending on the focal position (or position of the focal plane) can be seen as intensity changes in the image. In this case, each phase image P1-P5 (FIG. 2) is calculated from at least two intensity images B1-B7 which are each assigned directly adjacent positions of the focal plane. In the exemplary embodiment described here, each phase image P1 is calculated from three intensity images. By way of example, the phase image P1 is calculated from intensity images B1-B3 and the phase image P4 is calculated from intensity images B4, B5 and B6. Each calculated phase image P1-P5 is assigned a focal plane position $z_{P1}$, $z_{P2}$, . . . $z_{P5}$ on the basis of the positions $z_{B1}$-$z_{B7}$ of the focal plane assigned to the at least two intensity images B1-B7. Preferably, the median of the region whose boundaries are the most spaced apart positions of the focal plane of the intensity images B1-B7 used for the calculation of the corresponding phase image is determined as the focal plane position $z_{P1}$-$z_{P7}$. Thus, for example, $z_{P1}$ corresponds to $z_{B2}$ and $z_{P4}$ corresponds to $z_{B5}$.

By way of example, an algorithm that is based on the transport of intensity equation (TIE) can be used for this calculation of the phase images P1-P5. A simplified version of the TIE emerges from the approximation of a constant intensity distribution (see also A. Barty, K. A. Nugent, D. Paganin and A. Roberts "Quantitative optical phase microscopy", Opt. Lett. 23, 817-819 (1998)).

Even though each phase image P1-P5 in the exemplary embodiment described here is calculated from at least two intensity images B1-B7 which are respectively assigned directly adjacent positions of the focal plane, this is not mandatory. It may also be advantageous for adjacent intensity images (e.g. B1 and B3, and B3 and B5 if the intensity images B1, B3 and B5 are used) which are used to calculate a phase image (e.g. P2) to have positions in the focal plane (e.g. $z_{B1}$, $z_{B3}$ and $z_{B5}$) which are not directly adjacent (consequently $z_{B1}$ and $z_{B3}$, and $z_{B3}$ and $z_{B5}$ in this case). The intensity images used consequently have a greater spacing of the positions of the focal planes than the directly adjacent intensity images B1-B7 in the stack of intensity images B1-B7 or in the defocus stack B1-B7.

Then, at least one focus measure value is calculated for each of the phase images P1-P5 (step S3 in FIG. 3). By way of example, a focus measure is the sum of the xy-gradients.

The calculated focus measure values are assigned focal plane positions by way of the phase images P1-P5. Consequently, the optimal position $z_{opt}$ of the focal plane can be determined from the sequence of the focus measure values of the phase images P1-P5. To this end, it is possible, for example, to search for the maximum of the focus measure values and fit a parabola to the maximum and its adjacent values, with the relative position of this parabola being used to determine the optimal position $z_{opt}$ of the focal plane accurately, even between the focal plane positions $z_{P1}$-$z_{P5}$ and consequently the positions of the focal plane $z_{B1}$-$z_{B7}$ of the intensity images B1-B7 (step S4 in FIG. 3). This determined optimal position $z_{opt}$ of the focal plane, plotted in FIG. 2 in exemplary fashion, can for example subsequently be homed in on in order to make the desired sharp recording of the specimen 2 (step S5 in FIG. 3) and/or to create a focus map (step S6 in FIG. 3). Further, an offset defined in advance, for example, can be added to this determined optimal position $z_{opt}$ of the focal plane in order, for example, to be able to take account of different focal positions for a fluorescence recording in relation to the transmitted light recording. By way of example, this may be necessary if the optical image representation has longitudinal chromatic aberrations and the recordings are made for different wavelengths/wavelength ranges.

By way of example, a focus map can be created if a relatively large region of the specimen 2 should be recorded in magnified fashion. In this case, the specimen 2 is recorded with a high magnification at many positions (each position is referred to as an image tile) and the image tiles are joined to form a large contiguous image. Since the depth of field of the imaging optical unit 10 is usually small in the case of high magnifications, and the specimen 2 is not planar at the order of the depth of field or is moved at a tilt to the optical axis, the specimen 2 needs to be refocused every so often. For the experiment to run quickly, it is therefore advantageous to initially determine the optimal position of the focal plane of the specimen 2 at different support points of the specimen 2. In the process, it is initially sufficient for this to be implemented at spacings that are greater than one image tile, and for the optimal position of the focal plane of image tile positions located therebetween to be determined by interpolation.

Advantageously, it is possible for the images at the respective z-positions not to be recorded in a start-stop mode for the purposes of a quick recording of the intensity images B1-B7. Instead, a continuous movement is carried out in the z-direction over the entire region of the desired z-stack and the specimen 2 is illuminated using only short light pulses (for example for approximately 10 µs by the light source 6)

in order to minimize a motion blur in the image recording during the z-movement. Alternatively, it is possible to use short exposure times of the camera 11 and to let the light source 6 shine continuously. However, a disadvantage thereof is that the specimen 2 is unnecessarily burdened by light outside of the exposure time in certain circumstances. Additionally, the heat load in the specimen 2 may be too high on account of the continuous illumination. In order to be able to know or define the z-position of the specimen 2 during the image recording as accurately as possible, it is advantageous to control the recording by the camera 12, the short-term illumination by means of the light source 6 and the z-movement using a trigger. The z-position could possibly also be read in triggered fashion.

The distance between two positions $z_{B1}$-$z_{B7}$ in the focal plane when recording the intensity images B1-B7 is preferably constant. Further, this distance can preferably be greater than the depth of field of the imaging optical unit 4 and less than or equal to twice the depth of field of the imaging optical unit 4. A pinhole aperture can be provided in the aperture plane of the condenser optical unit 7 for the purpose of generating spatial coherence. In particular, a quasi-collimated illumination may be provided.

The temporal coherence can be realized not only on the illumination side by way of the bandpass filter 8 described, but also on the detection side by way of an appropriate bandpass filter. In this case use can be made of a present fluorescence emission filter, for example.

The light source 6 can be an LED light source or a laser light source.

The utilized wavelength can originate from the visible range or from the near infrared. If light from the near infrared is used, there may be a lower load on the specimen and/or less bleaching of a dye. It may also be possible to carry out a recording in the fluorescence channel in parallel by way of a wavelength-dependent beam splitter. The determined optimal position of the focal plane can be used for an autofocus function and/or for creating a focus map with separate interfaces.

According to the invention, it is further possible to illuminate the specimen with incoherent light and not provide any measures increasing the coherence on the detection side either. In this way, too, the optimal position $z_{opt}$ of the focal plane can be determined in the manner described by way of at least one focus measure of the phase images P1-P5.

In addition to the focus measure value of the sum of the xy-gradients, already described above, use can also be made of other focus measures known to a person skilled in the art, which as a rule in terms of their fundamental approach assess the image sharpness of the image (in this case of the phase image P1-P5). The application of a Gaussian filter or a Laplace filter to the image data can be mentioned in an exemplary manner as a focus measure. Threshold methods or variance methods are also possible. In particular, it is possible to use the focus measures described in the article "Evaluation of autofocus measures for microscopy images of biopsy and cytology", R. Redondo, et. al., Proc. of SPIE Vol. 8011 801194-1 to 801194-9. Naturally, it is also possible to use not only one focus measure but two, three or more different focus measures.

What is claimed is:

1. A method for determining an optimal position of a focal plane for examining a specimen by microscopy, the method comprising:
    a) illuminating the specimen with light and recording images of the illuminated specimen at a plurality of different positions of focal plane to generate a stack of intensity images of the illuminated specimen, with each intensity image in the stack of intensity images corresponding to a respective focal plane position;
    b) calculating a phase image from at least two of the intensity images from the stack of intensity images, with the calculated phase image corresponding to a respective focal plane position within a focal plane region whose boundaries are the two most spaced apart positions of the focal plane of the plurality of intensity images;
    c) repeating step b) multiple times with different intensity images to generate a stack of phase images;
    d) calculating at least one focus measure value for each respective phase image; and
    e) determining the optimal position of the focal plane from the calculated focus measure values and the focal plane positions assigned to the phase images.

2. The method of claim 1, wherein in step a) the specimen is illuminated via an illumination module, and the images of the illuminated specimen are recorded via an imaging module, with a numerical aperture of the illumination module being smaller than a numerical aperture of the imaging module.

3. The method of claim 1, wherein in step a) the specimen is illuminated by light whose spectrum has a bandwidth of less than or equal to 70 nm.

4. The method of claim 1, wherein light coming from the specimen is filtered such that the light has a spectrum bandwidth of less than or equal to 70 nm, and wherein the images in step a) are recorded using the filtered light.

5. The method of claim 1, wherein the images in step a) are recorded in transmitted light.

6. The method of claim 1, wherein in step b) the focal plane position is located in the center of the focal plane region.

7. The method of claim 1, wherein in step b) at least two of the plurality of intensity images are each assigned directly adjacent positions of the focal plane in the stack of the intensity images.

8. The method of claim 1, wherein in step a) the position of the focal plane is altered continuously and the images are recorded at the plurality of different positions in the process.

9. A device for determining the optimal position of a focal plane for examining a specimen by microscopy, the device comprising an illumination module to illuminate the specimen, an imaging module to record images of the illuminated specimen, and a control unit to control the illumination module and imaging module, the control unit configured to carry out a plurality of steps, comprising:
    a) illuminating the specimen with light and recording images of the illuminated specimen at a plurality of different positions of focal plane to generate a stack of intensity images of the illuminated specimen, with each intensity image in the stack of intensity images corresponding to a respective focal plane position;
    b) calculating a phase image from at least two of the intensity images from the stack of intensity images, with the calculated phase image corresponding to a respective focal plane position within a focal plane region whose boundaries are the two most spaced apart positions of the focal plane of the plurality of intensity images;
    c) repeating step b) multiple times with different intensity images to generate a stack of phase images;
    d) calculating at least one focus measure value for each respective phase image; and e) determining the optimal position of the focal plane from the calculated focus measure values and the focal plane positions assigned to the phase images.

\* \* \* \* \*